(12) United States Patent
Karras et al.

(10) Patent No.: US 8,095,012 B1
(45) Date of Patent: Jan. 10, 2012

(54) HIGH SPUR-FREE DYNAMIC RANGE RECEIVER

(75) Inventors: Thomas W. Karras, Berwyn, PA (US); Anthony C. Kowalczyk, San Carlos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 779 days.

(21) Appl. No.: 12/184,047

(22) Filed: Jul. 31, 2008

(51) Int. Cl.
*H04B 10/00* (2006.01)
(52) U.S. Cl. .................................. 398/115; 398/201
(58) Field of Classification Search .......... 398/115–117, 398/201
See application file for complete search history.

(56) References Cited

U.S. PATENT DOCUMENTS 7,835,650 B2 * 11/2010 Li et al. ................ 398/212
2009/0074421 A1 * 3/2009 Thaniyavarn ............ 398/116

OTHER PUBLICATIONS

Adil Karim, et al., "Increased Dynamic Range For Microwave Photonic Links", Presentation at NRO 2007 Technology Forum, May 30, 2007, L-3 Photonics.

* cited by examiner

*Primary Examiner* — Leslie Pascal
(74) *Attorney, Agent, or Firm* — McDermott Will & Emery LLP

(57) ABSTRACT

A receiver system comprises an antenna configured to receive an input RF signal, a high spur free dynamic range modulator configured to receive the input RF signal from the antenna and to convert the input RF signal to an optical signal, and a tunable filter configured to receive the optical signal and to output a filtered optical signal. The tunable filter includes at least one electro-optic resonator, at least one electrode configured to supply an electrical control signal to the electro-optic resonator, and a controller configured to adjust the electrical control signal to adjust a refractive index of the electro-optic resonator, whereby a resonant frequency of the electro-optic resonator is selectably adjusted. The receiver system further comprises a receiver configured to receive the filtered optical signal.

30 Claims, 7 Drawing Sheets

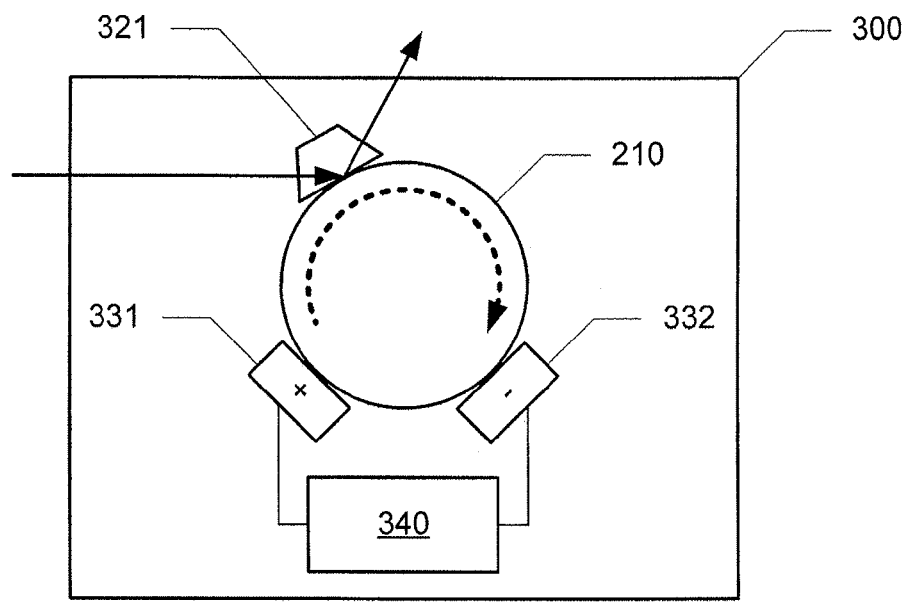
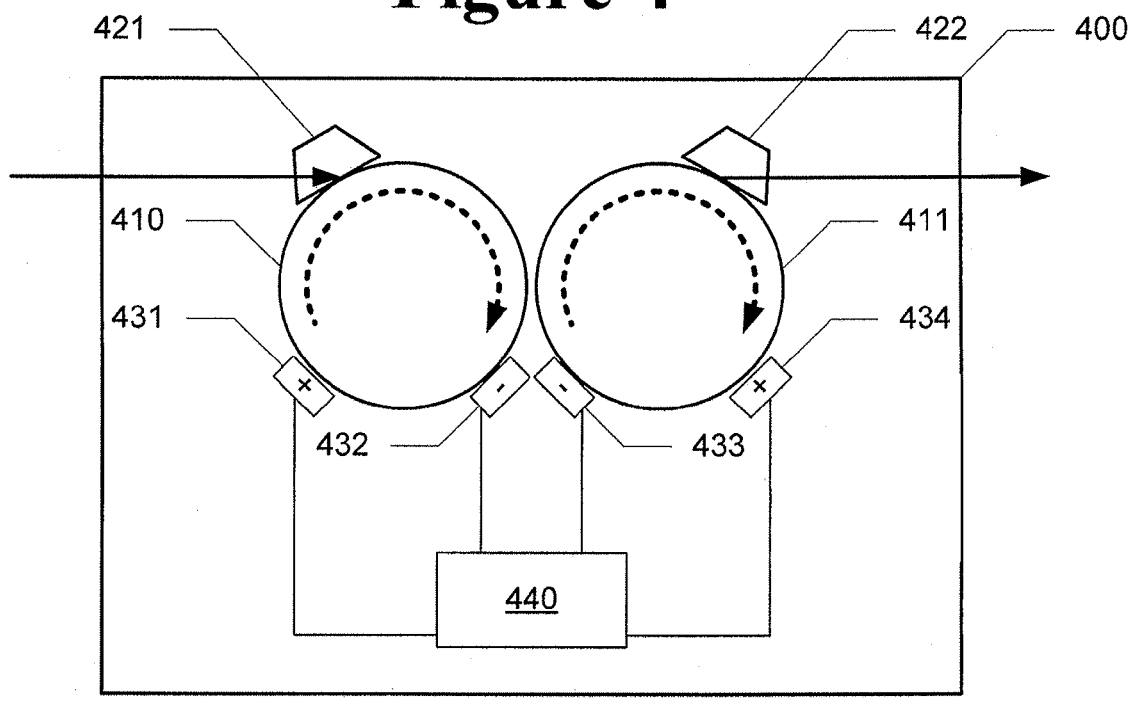

HIGH SPUR-FREE DYNAMIC RANGE RECEIVER

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The present invention generally relates to receivers and, in particular, relates to high spur-free dynamic-range ("SFDR") receivers.

BACKGROUND OF THE INVENTION

To receive radio frequency ("RF") signals with a sufficient signal-to-noise ratio "SNR," it is frequently necessary to selectively filter interfering signals in frequency bands adjacent to the RF signal of interest. Many receivers, however, are unable to selectively filter interfering signals with sufficient performance, particularly rapid tunability, to utilize the RF signal in high-bandwidth operations.

SUMMARY OF THE INVENTION

Various embodiments of the present invention solve the foregoing problems by providing a receiver with high spur-free dynamic range ("SFDR"). The receiver includes one or more tunable filters, each of which includes one or more electro-optic resonators. These resonators, which operate in a whispering-gallery mode ("WGM"), can be rapidly tunable and provide precise, narrow bandwidth filtering for separating signals of interest and for suppressing interference from frequencies adjacent to those signals of interest. The receiver further includes a high spur free dynamic range modulator, which has a very linear characteristic, so that only low level new RF spurs are generated. This may be true of succeeding components during operation, so that the range between the signal and the spurs is very high (ensuring that the receiver is a high spur free dynamic range receiver). The receiver may further include one or more Brillouin amplifiers and/or attenuators, which are also highly tunable and capable of amplifying a narrow bandwidth signal of interest, and/or attenuating the adjacent frequencies.

According to one embodiment of the present invention, a receiver system comprises an antenna configured to receive an input RF signal, a high spur free dynamic range modulator configured to receive the input RF signal from the antenna and to convert the input RF signal to a optical signal, and a tunable filter configured to receive the optical signal and to output a filtered optical signal. The tunable filter includes at least one electro-optic resonator, at least one electrode configured to supply an electrical control signal to the electro-optic resonator, and a controller configured to adjust the electrical control signal to adjust a refractive index of the electro-optic resonator, whereby a resonant frequency of the electro-optic resonator is selectably adjusted. The receiver system further comprises a receiver configured to receive the filtered optical signal.

According to another embodiment of the present invention, a receiver system comprises an antenna configured to receive an input RF signal, a splitter configured to split the input RF signal into a first RF signal and a second RF signal, and first and second high spur free dynamic range modulators configured to receive the first and second RF signals, respectively, from the splitter and to convert the first and second RF signals to first and second optical signals. The receiver system further comprises first and second tunable filters configured to receive the first and second optical signals and to output first and second filtered optical signals. The first and second tunable filter each include at least one electro-optic resonator, at least one electrode configured to supply an electrical control signal to the electro-optic resonator, and a controller configured to adjust the electrical control signal to adjust a refractive index of the electro-optic resonator, whereby a resonant frequency of the electro-optic resonator is selectably adjusted. The receiver system further comprises a balanced receiver configured to receive the first and second filtered optical signals.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 3 illustrates an electro-optic resonator in accordance with one embodiment of the present invention;

FIG. 4 illustrates an electro-optic resonator in accordance with one embodiment of the present invention;

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
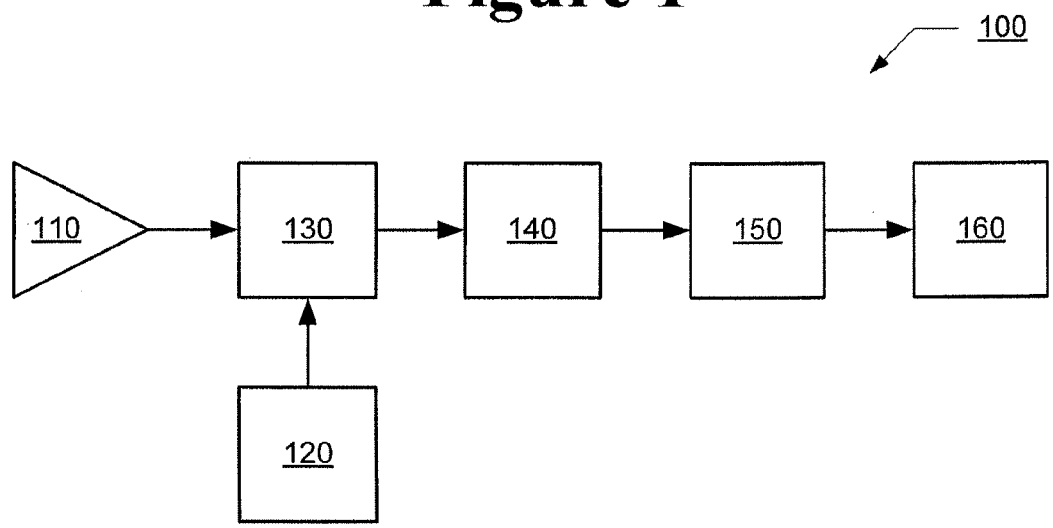
FIG. 1 illustrates a high spur-free dynamic range receiver in accordance with one embodiment of the present invention.

FIG. 1 illustrates a block diagram of a high spur-free dynamic range ("SFDR") receiver in accordance with one embodiment of the present invention. The high SFDR receiver 100 includes an antenna 110 that receives an incoming RF signal. The RF signal is modulated onto an optical carrier, produced by laser 120, in modulator 130. In accordance with various aspects of the present invention, modulator 130 may be an electro-absorption modulator ("EAM"), a Mach Zehnder interferometer ("MZI"), or the like. The output optical signal from modulator 130 is provided to a highly tunable filter 140. In accordance with various embodiments of the present invention, filter 140 may be configured as a notch filter (i.e., one that attenuates a narrow bandwidth of frequencies) or as a bandpass filter (i.e., one that attenuates all frequencies except for narrow bandwidth). In accordance with various embodiments of the present invention, a second filter, such as filter 150, may also be included to provide highly tunable filtering on a separate bandwidth than is passed by filter 140. After the optical signal has been filtered by filters 140 and 150, it is provided to receiver 160.

According to one aspect of the present invention, a high SFDR receiver such as receiver 100 can perform frequency translation on a signal through the use of close sideband, generated by mixing a local oscillator either in an external modulator, or directly in a modulatable laser at the front end. Those of skill in the art will immediately recognize that directly modulatable lasers can be modulated at very high frequencies.

Figure 2:
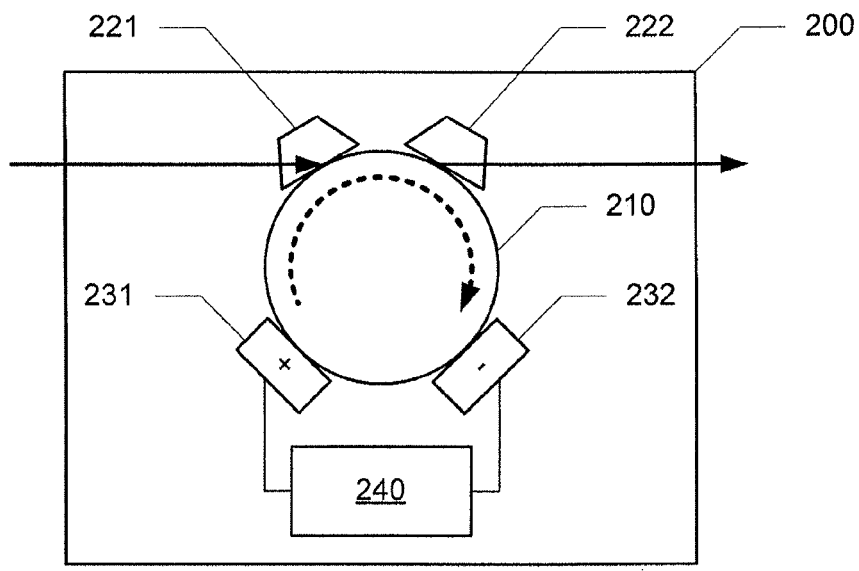
FIG. 2 illustrates an electro-optic resonator in accordance with one embodiment of the present invention.

A highly tunable filter 200 is illustrated in greater detail in FIG. 2, in accordance with one aspect of the present invention. Filter 200 includes an electro-optic resonator 210. Electro-optic resonator 210 supports a whispering-gallery mode ("WGM") of resonance, in which light with an evanescent wave component travels via internal reflection around the periphery of optical resonator 210. The resonance condition of resonator 210 produces a spectral transmission window with a very narrow bandwidth, due to the high quality factor ("Q") of the resonator. This bandwidth can be as narrow as a few KHz, but many applications only require tens of MHz. The width of the transmission resonance is also a function of other properties of the resonator, such as its size. Accordingly, resonator 210 transmits light only at a narrow range of wavelengths that is resonant with a WGM mode thereof.

According to one aspect of the present invention, resonator 210 has a non-spherical geometry. For example, in the present exemplary embodiment, resonator 210 is an oblate spheroid, illustrated in a plan view with its semi-major axis in the plane of the drawing. In various other aspects of the present invention, resonators with various other non-spherical geometries may be provided, including, for example, prolate spheroidal, scalene ellipsoidal, toroidal, conical, cylindrical, etc. According to one aspect of the present invention, optical resonator 210 comprises lithium niobate. According to another aspect of the present invention, optical resonator 210 comprises lithium tantalate. In accordance with other embodiments, however, optical resonator 210 may comprise any one of a number of other electro-optic materials, which are capable of supporting a whispering-gallery mode of resonance.

Light is coupled in and out of resonator 210 by optical couplers 221 and 222, respectively. The distance between optical couplers 221 and 222 and the resonator 210 is determined based upon the extent to which the evanescent wave extends beyond the outer surface of resonator 210. According to one aspect of the present invention, this distance is less than or equal to one wavelength of the light which resonates in resonator 210.

The refractive index of resonator 210 may be adjusted by changing an electric field applied across resonator 210, in accordance with one aspect of the present invention. By varying the refractive index of resonator 210, the wavelength of light which is internally reflected in the resonator, and at which a transmission peak of resonator 210 is located, may be tuned. Accordingly, filter 200 includes electrodes 231 and 232, which are operably coupled to resonator 210, and are supplied with a control signal by processor 240. Accordingly, filter 200 is capable of receiving an optical signal, coupling it into resonator 210 through optical coupler 221, and outputting a portion of the optical signal at a resonant wavelength of resonator 210 to optical coupler 222. The resonant wavelength of resonator 210 can be tuned by varying the control signal provided by processor 240 to electrodes 231 and 232, such that filter 200 operates as a tunable, narrow bandwidth bandpass filter.

While filter 200 has been illustrated as including only one electro-optic resonator, the scope of the present invention is not limited to such an arrangement. Rather, as will be readily apparent to those of skill in the art, the present invention has application to filters including any number of electro-optic resonators.

According to one aspect of the present invention, a tunable filter may utilize a WGM resonator to implement a notch filter, in which a narrow bandwidth of frequencies is attenuated. One such filter 300 is illustrated in FIG. 3, in accordance with one aspect of the present invention. Filter 300 includes an electro-optic WGM resonator 310. Light with the resonant wavelength of resonator 310 is coupled into resonator 310 by optical coupler 321. The remaining light, in which the resonant wavelength has been attenuated, is redirected by optical coupler 321 out of filter 300. In a fashion similar to filter 200 illustrated in FIG. 2, the refractive index of resonator 310 may be adjusted by changing an electric field applied across it. Accordingly, filter 200 includes electrodes 331 and 332, which are operably coupled to resonator 310, and are supplied with a control signal by processor 340. Thus, filter 300 is capable of receiving an optical signal, coupling a resonant wavelength thereof into modulator 310 through optical coupler 321, and outputting the remaining wavelengths thereof from filter 300. The resonant wavelength of modulator 310 can be tuned by varying the control signal provided by processor 340 to electrodes 331 and 332, such that filter 300 operates as a tunable, narrow bandwidth notch filter.

According to one aspect of the present invention, tunable notch and bandpass filters may include multiple WGM resonators. One such bandpass filter is illustrated in FIG. 4, in accordance with one aspect of the present invention. Bandpass filter 400 includes two electro-optic WGM resonators 410 and 411. An optical signal is input to resonator 410 by optical coupler 421, and a filtered optical signal is output from resonator 411 by optical coupler 422. The distance between resonators 410 and 411 is determined based upon the extent to which the evanescent wave in each resonator extends beyond the outer surface thereof. The refractive index of resonator 410 is controlled by controller 440 varying an electrical control signal to electrodes 431 and 432, and the refractive index of resonator 411 is controlled by controller 440 varying an electrical control signal to electrodes 433 and 434. According to one aspect of the present invention, controller 440 adjusts the refractive index of resonators 410 and 411 to be slightly different, such that by summing the response curves of the two resonators, a square bandpass filter can be better approximated. As will be readily apparent to those of skill in the art, a square wave can be approximated from summing several adjacent Lorentzian waves, Gaussian waves, or waves with other response curves. While the present exemplary embodiment is illustrated with merely two resonators, filters employing additional resonators can be readily implemented in a similar manner. For example, a filter with as many as 10 resonators may be employed to achieve an excellent approximation of an ideal bandpass filter, while a filter with fewer resonators (e.g., 3, 5, 7, etc.) may strike an acceptable balance between bandpass filtering performance and complexity.

While the present exemplary embodiment has been illustrated with respect to a bandpass filter, those of skill in the art will readily understand that an improved-performance notch filter can similarly comprise multiple electro-optic resonators to better approximate an ideal notch filter. For example, a filter with as many as 10 resonators may be employed to achieve an excellent approximation of an ideal notch filter, while a filter with fewer resonators (e.g., 3, 5, 7, etc.) may strike an acceptable balance between notch filtering performance and complexity.

According to another aspect of the present invention, bandpass filter tuning can be provided by fine scanning of the original laser wavelength or of a close sideband produced by an injected local oscillator. In this way, some of the filters may be made from resonators that are not composed of a tunable material. Independent tunability of at least some of the filters is often required, however, and so in some embodiments, at least one of the filters may include tunable resonators. Accordingly, in one embodiment of the present invention, a receiver system may be provided with multiple tunable filters, of which one may be a tunable bandpass filter that does not include a tunable resonator. In such an embodiment, the receiver may include a local oscillator that is injected into a directly modulated laser or into an external modulator, in order to tune the bandpass filter. In another embodiment, the laser wavelength is tuned by small changes in the laser's drive current or its temperature.

Figure 5A:
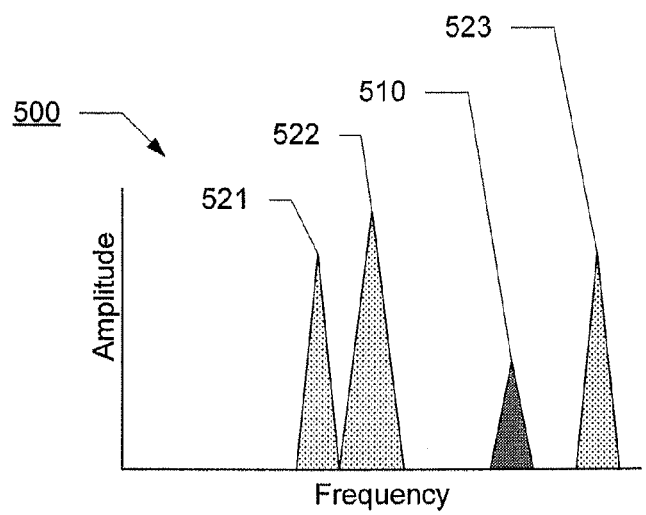
FIGS. 5a to 5c graphically illustrate the result of optical RF filtering with a high spur-free dynamic range receiver in accordance with one embodiment of the present invention.
Figure 5B:
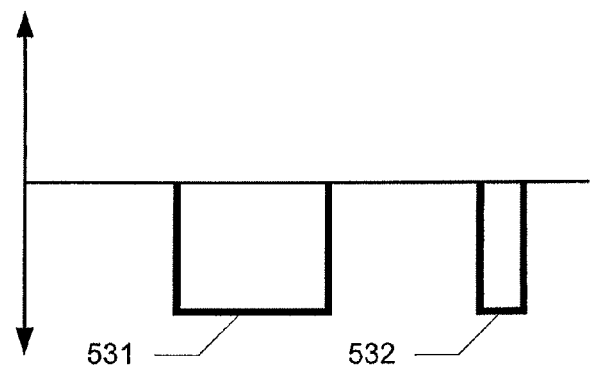
Figure 5C:
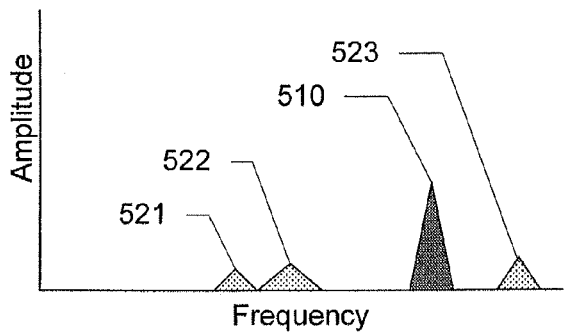
Figure 6A:
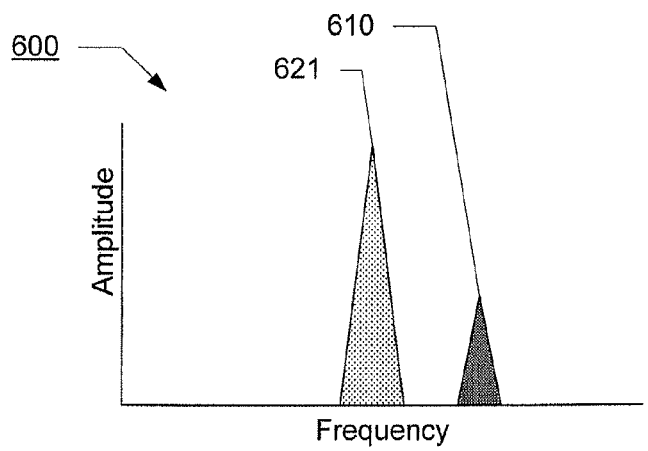
FIGS. 6a to 6c graphically illustrate the result of optical RF filtering with a high spur-free dynamic range receiver in accordance with one embodiment of the present invention.
Figure 6B:
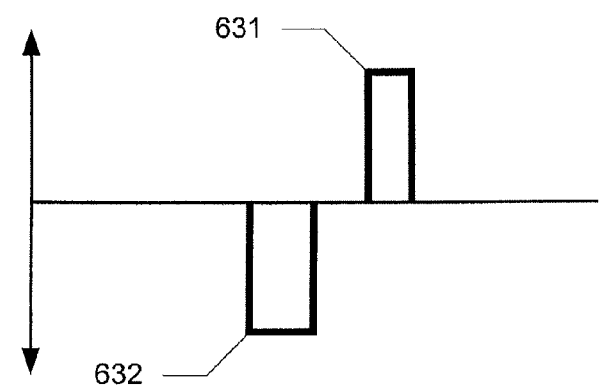
Figure 6C:
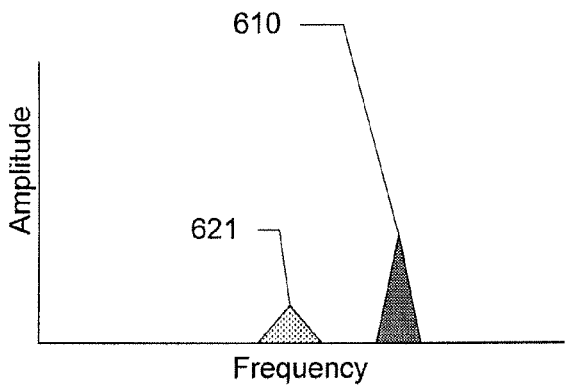

According to an additional aspect of the present invention, supplying a filter with multiple resonators may also provide for broader and controllable bandwidth notch and bandpass filters, capable of attenuating and/or passing unattenuated larger portions of an optical signal. For example, FIGS. 5a to 5c graphically illustrated the result of optical RF filtering with a high SFDR receiver employing a narrow notch filter and a broader notch filter in accordance with one embodiment of the present invention. FIG. 5a illustrates an input optical signal 500, which includes a signal of interest 510 and several interferers 521, 522 and 523. FIG. 5b graphically illustrates the response curve of an exemplary high SFDR receiver system, employing a broad notch filter 531 and a narrow notch 532 filter. The optical signal output from the filter is illustrated in FIG. 5c, in which the interferers are seen to have been dramatically attenuated, while leaving closely adjacent signal of interest 510 unaffected. FIGS. 6a to 6c graphically illustrated the result of optical RF filtering with another exemplary high SFDR receiver employing a narrow notch filter and a broader bandpass filter in accordance with one embodiment of the present invention. FIG. 6a illustrates an input optical signal 600, which includes a signal of interest 610 and an interferer 621. FIG. 6b graphically illustrates the response curve of an exemplary high SFDR receiver system, employing a broad passband filter 631 and a narrow notch 632 filter. The optical signal output from the filter is illustrated in FIG. 6c, in which the interferers are seen to have been dramatically attenuated, while leaving closely adjacent signal of interest 610 unaffected.

According to another aspect of the present invention, the signal of interest may have a structure that is to be separated with a bandpass filter. In such a case, the bandpass filter may be a multipole filter with very steep skirts. Such a filter can be tuned so as to transmit a selectable portion of the signal of interest.

Figure 7:
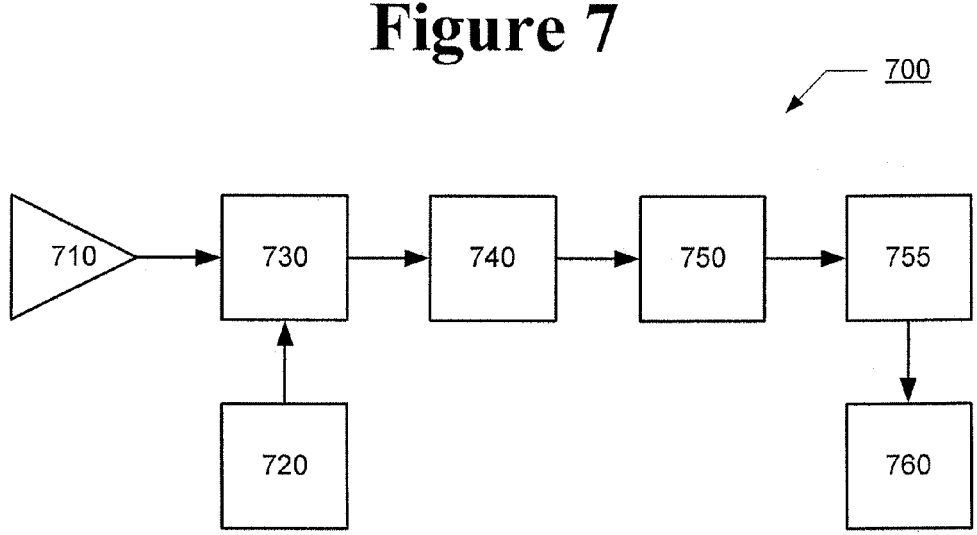
FIG. 7 illustrates a high spur-free dynamic range receiver in accordance with one embodiment of the present invention.

According to one embodiment of the present invention, a high SFDR receiver may further include a highly tunable amplifier, to further improve the SNR of a signal of interest. One such high SFDR receiver is illustrated in FIG. 7, in accordance with one embodiment of the present invention. High SFDR receiver 700 includes an antenna 710 that receives an incoming RF signal. The RF signal is modulated onto an optical carrier, produced by laser 720, in modulator 730. The output optical signal from modulator 730 is provided to highly tunable filters 740 and 750, such as those discussed in greater detail above with reference to FIGS. 2 to 4. After filtering, the optical signal is provided to a highly tunable amplifier 755, such as a Brillouin amplifier, which amplifies a narrow bandwidth corresponding to the signal of interest, and then passes the amplified optical signal on to receiver 160.

Figure 8A:
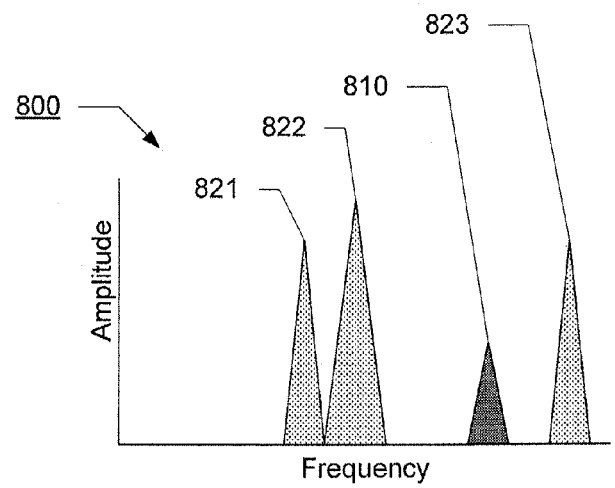
FIGS. 8a to 8c graphically illustrate the result of optical RF filtering and amplification with a high spur-free dynamic range receiver in accordance with one embodiment of the present invention.
Figure 8B:
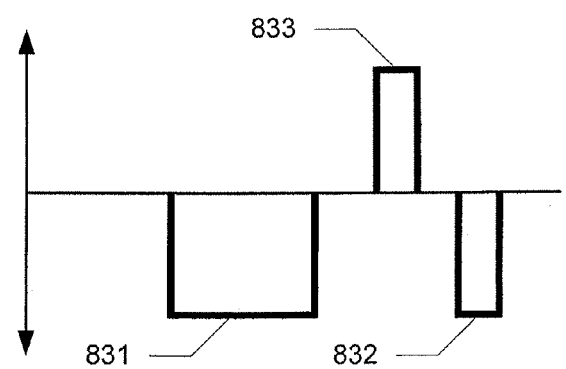
Figure 8C:
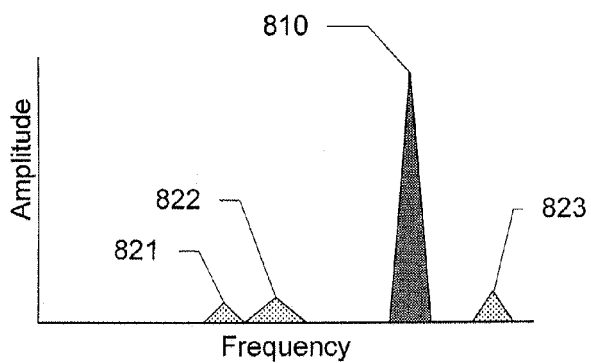

FIGS. 8a to 8c graphically illustrated the result of optical RF filtering and amplification with a high SFDR receiver in accordance with one embodiment of the present invention. FIG. 8a illustrates an input optical signal 800, which includes a signal of interest 810 and several interferers 821, 822 and 823. FIG. 8b graphically illustrates the response curve of an exemplary high SFDR receiver system, employing a broad notch filter 831, a narrow notch 832 filter, and a Brillouin amplifier 833. The optical signal output from the filter is illustrated in FIG. 8c, in which the interferers are seen to have been dramatically attenuated, while closely adjacent signal of interest 810 has been greatly amplified.

Figure 9:
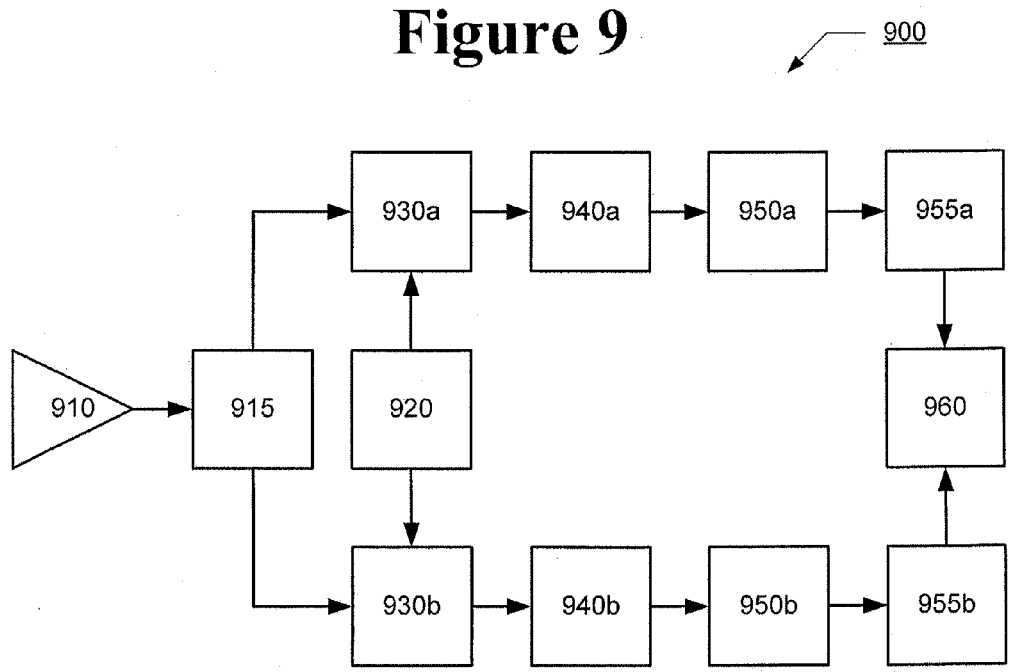
FIG. 9 illustrates a high spur-free dynamic range receiver in accordance with one embodiment of the present invention.

In accordance with another embodiment of the present invention, a high SFDR receiver system is provided with a balanced detector to reduce common mode noise from a processed optical signal. One such receiver system is illustrated in FIG. 9, in accordance with one embodiment of the present invention. Receiver system 900 includes an antenna 910 that receives an incoming RF signal. The RF signal is split by splitter 915, which provides a first signal to a first modulator 930a and a second signal to a second modulator 930b. Both modulators 930a and 930b are provided with a laser signal, onto which the first and second RF signals are modulated in modulators 930a and 930b, respectively. The output optical signals from modulators 930a and 930b are provided to highly tunable filters 940a, 940b, 950a and 950b, like those discussed in greater detail above with reference to FIGS. 2 to 4. After filtering, the optical signals are provided to highly tunable amplifiers 955a and 955b, which amplify a narrow bandwidth corresponding to the signal of interest. The amplified signals from amplifiers 955a and 955b are passed to a balanced detector 960, which cancels the common mode noise between the filtered signals, as will be readily understood by one of skill in the art.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the sprit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A receiver system, comprising:
   an antenna configured to receive an input RF signal;
   a high spur free dynamic range modulator configured to receive the input RF signal from the antenna and to convert the input RF signal to a optical signal;
   a tunable filter configured to receive the optical signal and to output a filtered optical signal, the tunable filter including:
     at least one electro-optic resonator,
     at least one electrode configured to supply an electrical control signal to the electro-optic resonator, and
     a controller configured to adjust the electrical control signal to adjust a refractive index of the electro-optic resonator, whereby a resonant frequency of the electro-optic resonator is selectably adjusted; and
   a receiver configured to receive the filtered optical signal.

2. The receiver system of claim 1, wherein the tunable filter is configured as a notch filter with a notch at about the resonant frequency of the electro-optic resonator.

3. The receiver system of claim 1, wherein the tunable filter is configured as a bandpass filter with a passband at about the resonant frequency of the electro-optic resonator.

4. The receiver system of claim 1, wherein the electro-optic resonator has a non-spherical geometry selected from the group consisting of spheroidal, ellipsoidal, toroidal, conical and cylindrical.

5. The receiver system of claim 1, wherein the electro-optic resonator comprises either lithium niobate or lithium tantalate.

6. The receiver system of claim 1, wherein the electro-optic resonator comprises an electro-optic material.

7. The receiver system of claim 1, wherein the tunable filter comprises a plurality of electro-optic resonators, each electro-optic resonator supplied with an electrical control signal by a corresponding at least one electrode.

8. The receiver system of claim 7, wherein the plurality of electrical control signals is adjusted by the controller.

9. The receiver system of claim 1, wherein the high spur free dynamic range modulator comprises an electro-absorption modulator.

10. The receiver system of claim 1, wherein the high spur free dynamic range modulator comprises a Mach Zehnder interferometer.

11. The receiver system of claim 1, further comprising a tunable Brillouin amplifier configured to receive the filtered optical signal from the tunable filter, to amplify at least a portion of the filtered optical signal, and to provide the amplified filtered optical signal to the receiver.

12. The receiver system of claim 1, further comprising a tunable Brillouin attenuator configured to receive the filtered optical signal from the tunable filter, to attenuate at least a portion of the filtered optical signal, and to provide the attenuate filtered optical signal to the receiver.

13. A receiver system, comprising:
    an antenna configured to receive an input RF signal;
    a splitter configured to split the input RF signal into a first RF signal and a second RF signal;
    first and second high spur free dynamic range modulators configured to receive the first and second RF signals, respectively, from the splitter and to convert the first and second RF signals to first and second optical signals;
    first and second tunable filters configured to receive the first and second optical signals and to output first and second filtered optical signals, the first and second tunable filter each including:
      at least one electro-optic resonator,
      at least one electrode configured to supply an electrical control signal to the electro-optic resonator, and
      a controller configured to adjust the electrical control signal to adjust a refractive index of the electro-optic resonator, whereby a resonant frequency of the electro-optic resonator is selectably adjusted; and
    a balanced receiver configured to receive the first and second filtered optical signals.

14. The receiver system of claim 13, wherein the balanced receiver is further configured to reject common mode noise from the first and second optical signals.

15. The receiver system of claim 13, wherein the first and second tunable filters are both configured as notch filters with a notch at about the resonant frequency of the electro-optic resonator.

16. The receiver system of claim 13, wherein the first and second tunable filters are both configured as bandpass filters with a passband at about the resonant frequency of the electro-optic resonator.

17. The receiver system of claim 13, wherein the first tunable filter is configured as a notch filter with a notch at about the resonant frequency of the respective electro-optic resonator, and the second tunable filter is configured as a bandpass filter with a passband at about the resonant frequency of the respective electro-optic resonator.

18. The receiver system of claim 13, wherein the electro-optic resonator of each of the first and second tunable filters has a non-spherical geometry selected from the group consisting of spheroidal, ellipsoidal, toroidal, conical and cylindrical.

19. The receiver system of claim 13, wherein the electro-optic resonator of each of the first and second tunable filters comprises either lithium niobate or lithium tantalate.

20. The receiver system of claim 13, wherein the electro-optic resonator of each of the first and second tunable filters comprises an electro-optic material.

21. The receiver system of claim 13, wherein the first and second tunable filters each comprise a plurality of electro-optic resonators, each electro-optic resonator supplied with an electrical control signal by a corresponding at least one electrode.

22. The receiver system of claim 21, wherein the plurality of electrical control signals in each of the first and second tunable filters are adjusted by the corresponding controller thereof.

23. The receiver system of claim 13, wherein the first and second high spur free dynamic range modulators comprise electro-absorption modulators.

24. The receiver system of claim 13, wherein the first and second high spur free dynamic range modulators comprise Mach Zehnder interferometers.

25. The receiver system of claim 13, further comprising first and second tunable Brillouin amplifiers configured to receive the first and second filtered optical signals from the first and second tunable filters, to amplify at least corresponding first and second portions of the first and second filtered optical signals, and to provide the amplified first and second filtered optical signals to the balanced receiver.

26. The receiver system of claim 13, further comprising first and second tunable Brillouin attenuators configured to receive the first and second filtered optical signals from the first and second tunable filters, to attenuate at least corresponding first and second portions of the first and second filtered optical signals, and to provide the attenuated first and second filtered optical signals to the balanced receiver.

27. The receiver system of claim 13, further comprising a local oscillator configured to mix a local oscillator signal with the first and second optical signals to provide frequency translation of the first and second optical signals.

28. The receiver system of claim 27, wherein the local oscillator signal is mixed with the first and second optical signals in an external modulator.

29. The receiver system of claim 27, wherein the local oscillator signal is injected into a modulatable laser configured to provide a laser signal to the first and second high spur free dynamic range modulators.

30. The receiver system of claim 29, wherein the frequency translation is provided by tuning a wavelength of the modulatable laser by modifying either a drive current or a temperature thereof.

\* \* \* \* \*